US 6,707,226 B2

(12) United States Patent
Umeda

(10) Patent No.: US 6,707,226 B2
(45) Date of Patent: Mar. 16, 2004

(54) ROTOR OF REVOLVING FIELD TYPE AC GENERATOR

(75) Inventor: Atsushi Umeda, Kariya (JP)

(73) Assignee: Denso Corporation, Kariya (JP)

( * ) Notice: Subject to any disclaimer, the term of this patent is extended or adjusted under 35 U.S.C. 154(b) by 45 days.

(21) Appl. No.: 09/983,488

(22) Filed: Oct. 24, 2001

(65) Prior Publication Data
US 2002/0135265 A1 Sep. 26, 2002

(30) Foreign Application Priority Data
Oct. 25, 2000 (JP) ........................................ 2000-325603

(51) Int. Cl.⁷ ................................................ H02K 1/22
(52) U.S. Cl. .................... 310/263; 310/181; 310/218
(58) Field of Search ......................... 310/263, 261, 310/181, 216–218, 156.01, 156.33, 156.48, 156.49, 156.68, 156.72

(56) References Cited

U.S. PATENT DOCUMENTS

| 5,306,977 | A | | 4/1994 | Hayashi | 310/263 |
| 5,502,424 | A | | 3/1996 | Kato et al. | 335/284 |
| 5,543,676 | A | | 8/1996 | York et al. | 310/263 |
| 5,907,209 | A | * | 5/1999 | Ishida | 310/263 |
| 5,973,435 | A | * | 10/1999 | Irie et al. | 310/263 |
| 6,011,343 | A | * | 1/2000 | Taniguchi | 310/263 |
| 6,037,695 | A | * | 3/2000 | Kanazawa et al. | 310/263 |
| 6,104,118 | A | * | 8/2000 | Kanazawa et al. | 310/263 |
| 6,311,383 | B1 | * | 11/2001 | Umeda et al. | 29/596 |
| 6,359,366 | B1 | * | 3/2002 | Liang et al. | 310/263 |
| 6,373,166 | B1 | * | 4/2002 | Asao et al. | 310/263 |
| 6,384,506 | B1 | * | 5/2002 | Kojima et al. | 310/194 |
| 6,426,581 | B1 | * | 7/2002 | York et al. | 310/263 |
| 6,437,477 | B1 | * | 8/2002 | Krefta et al. | 310/263 |

FOREIGN PATENT DOCUMENTS

| EP | 0 718 959 A2 | 6/1996 |
| JP | A 2-164250 | 6/1990 |
| JP | A 4-49836 | 2/1992 |
| JP | A 7-298585 | 11/1995 |
| JP | A 2000-209825 | 7/2000 |
| JP | A 2001-136693 | 5/2001 |

* cited by examiner

Primary Examiner—Dang Le
Assistant Examiner—Leda Pham
(74) Attorney, Agent, or Firm—Oliff & Berridge, PLC

(57) ABSTRACT

A rotor of an AC generator includes a field coil, a pole core having a plurality of claw poles disposed in the circumferential direction to enclose the field coil to provide a plurality of magnetic fields when the field coil is energized and a cylindrical permanent magnet disposed inside the plurality of claw poles to supplement the plurality of magnetic fields. The cylindrical permanent magnet is easy to orient magnetic character so that strong magnetic field can be provided at a low cost.

14 Claims, 5 Drawing Sheets

ROTOR OF REVOLVING FIELD TYPE AC GENERATOR

CROSS REFERENCE TO RELATED APPLICATION

The present application is based on and claims priority from Japanese Patent Application 2000-325603 filed Oct. 25, 2000, the contents of which are incorporated herein by reference.

BACKGROUND OF THE INVENTION

1. Field of the Invention

The present invention relates to a revolving field type AC generator and, particularly, a rotor that has a plurality of circumferentially disposed claw poles.

2. Description of the Related Art

Recently, as various efforts to reduce vehicle running resistance such as shaping the vehicle front into a slant nose and to increase the passenger compartment of a vehicle have been made, the engine compartment of the vehicle has become narrower and narrower. Accordingly, there is only a limited room for an AC generator. Such an AC generator has to be driven at a lower speed in order to reduce fuel consumption of an engine. On the other hand, various safety devices have been installed into a vehicle, and the AC generator has been required to increase electric power. In other words, a more compact and more powerful AC generator has been demanded.

In order to fulfill this demand, various improvements on a rotor and a stator have been proposed. For example, a plurality of permanent magnets is inserted between pole pieces of a rotor to supplement effective magnetic flux, thereby increasing output power. For this purpose, the permanent magnets have to have precise dimensions to be assembled, resulting in that the manufacturing cost of the vehicle AC generator increases.

In order to solve the above problem, a magnet holder for holding a permanent magnet that allows variation in distances between pole pieces or a resinous permanent magnet that is easy to fill between the pole pieces were proposed. However, the magnet holder is rather complicated in shape, and the manufacturing cost thereof can not become lower. Because the shape of the resinous permanent magnet after being filled becomes also complicated, it is very difficult to form magnetic orientation that provides strong magnetic force. In addition, since it is difficult to bond the pole pieces and the permanent magnet tightly, the permanent magnet may fly off.

SUMMARY OF THE INVENTION

In view of the above problem, an object of the invention is to provide an AC generator that can be manufactured more easily at a lower cost.

For this purpose, a cylindrical permanent magnet is provided to supplement magnetic fields of the claw poles.

Another object of the invention is to provide a more reliable AC generator. In addition, another object of the invention is to provide a compact and powerful AC generator.

According to a feature of the invention, a cylindrical permanent magnet is disposed inside a plurality of claw poles to have the magnetic fields as the claw poles when the field coil is energized. Inner surfaces of the claw poles contact the outer periphery of the cylindrical permanent magnet so that centrifugal force of the cylindrical permanent magnet is supported by the claw poles. Therefore, a reliable AC generator can be provided.

In addition, because the cylindrical permanent magnet is magnetized to have the same polarity as the claw poles when the claw poles are excited by the field coil, a stator coil is supplied with magnetic flux from both the cylindrical permanent magnet and the claw poles, so that the output power can be increased to the same extent. Further, because of the simple cylindrical shape, the orientation of the cylindrical permanent magnet can be made easy so that strong permanent magnet can be provided.

According to another feature of the invention, two kinds of cooling fans are fixed to opposite axial ends of the pole core. Therefore, axial cooling airflow is generated due to a pressure difference in the axial direction. Because a gap is formed between the cylindrical permanent magnet and the field coil, the cylindrical permanent magnet and the field coil can be cooled effectively, so that effective magnetic fluxes of the cylindrical permanent magnet, which has a negative temperature characteristic, and of the field coil can be increased.

According to another feature of the invention, a magnetic member covers the inner surface of the cylindrical permanent magnet. Therefore, the cylindrical permanent magnet is reinforced to sufficiently withstand the centrifugal force. Further, the permeance of the cylindrical permanent magnet can be improved so that the cylindrical permanent magnet can be prevented from being demagnetized by the counter magnetic field of the field coil.

According to another feature of the invention, a non-magnetic member covers an outer periphery of the cylindrical permanent magnet. Therefore, even if the cylindrical permanent magnet is broken, the cylindrical permanent magnet is prevented from scattering. In addition, the non-magnetic member protects the cylindrical permanent magnet from foreign materials, so that a reliable AC generator can be provided.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
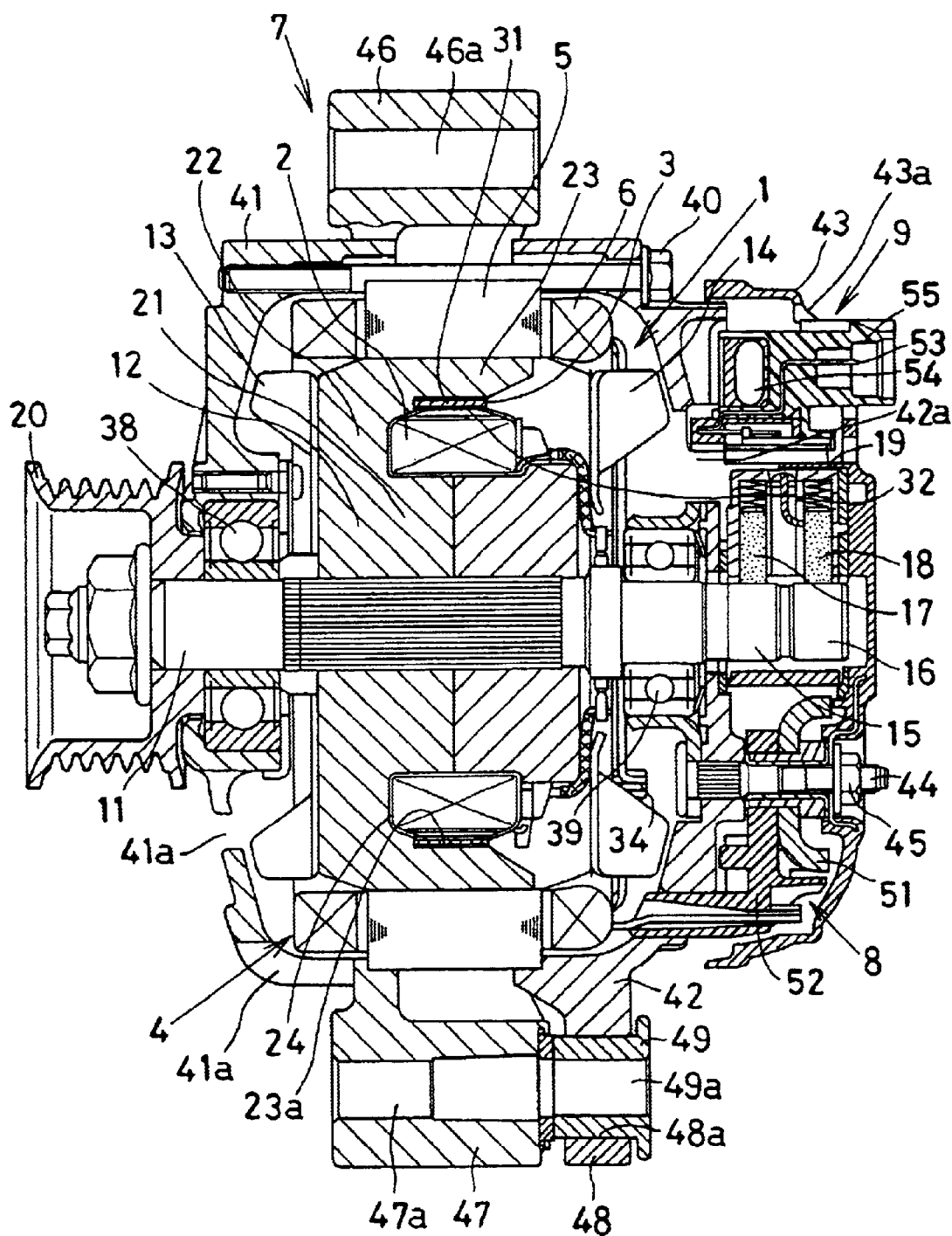
FIG. 1 is a cross-sectional view illustrating a vehicle AC generator as a whole.

A rotor of a field revolving type vehicle AC generator according to a first embodiment of the invention is described with reference to FIGS. 1–6.

The AC generator according to the embodiment is a revolving field type AC generator and a vehicle alternator. The AC generator is comprised of a rotor 1, a stator 4, a housing 7 that supports the field rotor 1 and the stator 4, a three-phase rectifier unit 8 and a voltage regulator 9.

The rotor 1 rotates with a rotary shaft 11 and is comprised of a pole core 12, a field coil 2, a cylindrical permanent magnet 3, a pair of cooling fans 13 and 14, a pair of slip rings 15 and 16, etc. The shaft 11 is connected to a pulley 20 to be driven by a vehicle engine (not shown).

The field coil 2 has a cylindrical body wound on a nylon-made or other resinous insulation bobbin 24. The field coil 2 generates magnetomotive force when the field current is supplied thereto.

The cylindrical permanent magnet 3 is a generally cylindrical rare earth permanent magnet, such as a neodymium (Nd) permanent magnet, which holds magnetic force for a long time. The cylindrical permanent magnet 3 is disposed between the outer periphery of the field coil 2 and the plurality of claw poles 23 of the pole core 12. The outer periphery of the cylindrical permanent magnet 3 contacts the inner surface of the claw poles 23 so that the cylindrical permanent magnet 3 is spaced apart from the field coil 2 so as to face the field coil 2 via an annular gap. The cylindrical permanent magnet 3 is magnetized to supplement the magnetic fields of the claw poles. In other words, the outer surfaces of the cylindrical permanent magnet 3 and the inner surfaces of the claw poles 23 in contact with the same outer surfaces of the cylindrical permanent magnet 3 have the same polarity when field current is supplied to the field coil. In other words, the cylindrical permanent magnet 3 is magnetized to supplement the effective magnetic flux of the claw poles when the field coil 2 is energized and generates the electromotive force.

The pole core 12 is comprised of a pair of front and rear core sections. Each core section is comprised of a cylindrical boss portion 21 that is force-fitted to a middle portion of the shaft 11, a yoke 22 radially extending from the outer periphery of the boss portion 21, a plurality of claw poles 23 axially extending from the yoke 22. The pole core 12 accommodates the field coil 2 between the claw poles 23 and cylindrical portions 21 of both the front and rear core sections so that the claw poles 23 can be polarized to alternately form N-pole and S-pole in the circumferential direction if magnetomotive force is generated by the field coil.

The cooling fans 13 and 14 are respectively fixed to front and rear ends of the yoke 22 of the pole core 12, by means of welding or the like. The cooling fans 13 and 14 are different in shape so that they can deliver different amounts of cooling air. The front cooling fan 13 is a mixed-flow-type cooling fan for blowing cooling air from the front end diagonally toward rear end. On the other hand, the rear cooling fan 14 is a centrifugal fan for blowing cooling air in only the radial direction. However, both the cooling fans 13 and 14 may be mixed flow fans or centrifugal fans.

The pair of slip rings 15 and 16 is fixed to an outer periphery at the rear end of the shaft 11 to supply field current from the brushes 17 and 18 that slide on the outer periphery of the slip rings to the field coil 2. The pair of brushes 17 and 18 is housed in a brush holder 19 that is fixed to a housing 7.

Figure 2:
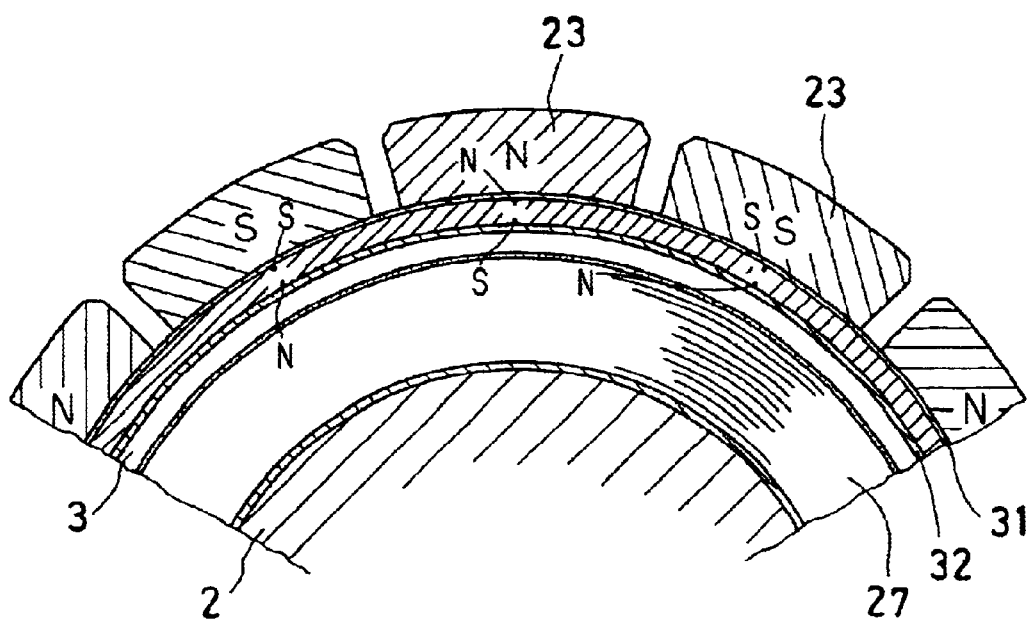
FIG. 2 is a fragmentary cross-sectional view illustrating a main portion of a rotor.
Figure 3:
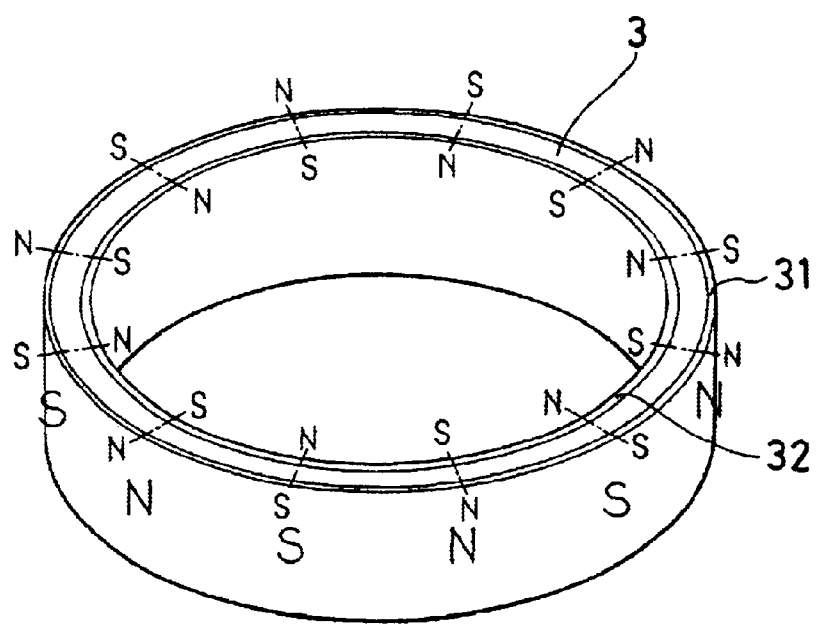
FIG. 3 is a perspective view illustrating a cylindrical permanent magnet as a whole.

The whole outer periphery of the cylindrical permanent magnet 3 is covered by a stainless-made non-magnetic member 31 and the whole inner surface of the same is covered by an iron-alloy-made magnetic member 32. The cylindrical permanent magnet 3, the non-magnetic member 31 and the magnetic member 32 are integrated with each other. The outer periphery of the cylindrical permanent magnet 3, as shown in FIGS. 2 and 3, is magnetized so that portions thereof in contact with the plurality of the claw poles can provide the same polarity as the claw poles in contact therewith when the field current is supplied to the field coil 2. The outer periphery of the cylindrical permanent magnet 3 is pressed against the inner surfaces of the claw poles 23 and fixed thereto.

An air gap 27 is formed between the cylindrical permanent magnet 3 and the outer periphery of the rotor 2. The air gap 27 provides a cooling air passage through which cooling air flows when the cooling fan 13 rotates. The cylindrical permanent magnet 3 is made of a rare earth permanent magnet material such as neodymium, or a resinous material. As shown in FIGS. 2 and 3, each pair of S-N poles is oriented in the radial direction so that S poles and N poles are disposed alternately on the outer and inner surfaces of the cylindrical permanent magnet 3. In order to restrict axial shift of the cylindrical permanent magnet 3, a recess 23a is formed on the inner surfaces of the plurality of claw poles 23 of the pole core 12.

The stator 4 is comprised of a stator core 5, and a three-phase stator coil 6 and is supported by the housing 7. The stator core 5 is a laminate of magnetic steel sheets that has a plurality of teeth 28 formed at the inner surface thereof in the circumferential direction at equal intervals and a plurality of slots 29 each of which is formed between the neighboring two teeth 28. The stator core 5 is fixed to the inner wall of the housing 7.

Figure 4:
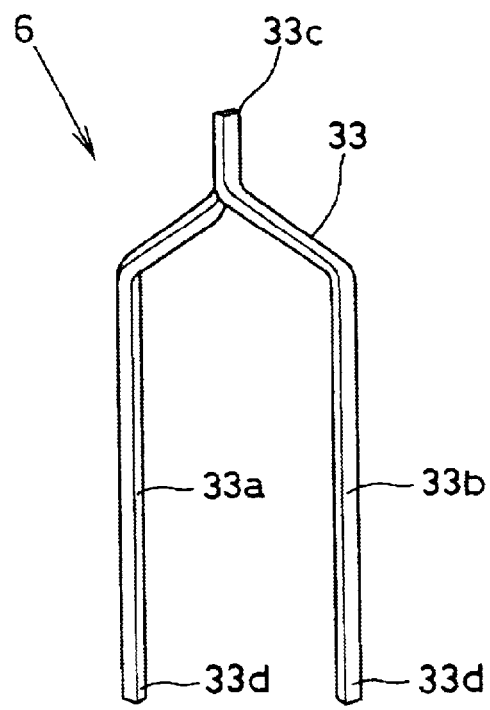
FIG. 4 is a perspective view illustrating a conductor segment of a three-phase stator coil.
Figure 5:
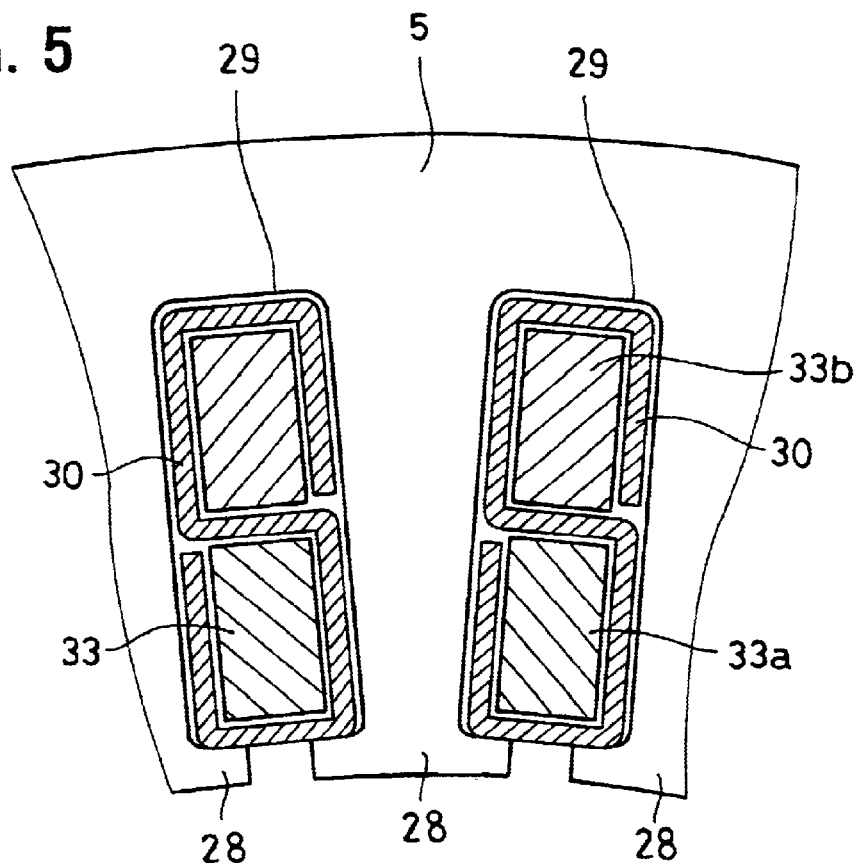
FIG. 5 is a fragmentary cross-sectional view illustrating a main portion of a stator.

The three-phase stator coil 6 is a Y or Δ-connected winding. The stator coil 6 is comprised of a plurality of U-shaped conductor segments 33, each of which has a pair of straight portions, as shown in FIG. 4. One of the pair of straight portions is disposed in the radially inner portion of the slot 29 near the mouth of the slot 29 of the stator core 5 to form an inner layer conductor 33a. The other is disposed in the radially outer portion of the slot near the back of the slot 29 to form an outer layer conductor 33b. In the slot 29, as shown in FIG. 5, an S-bent insulator 30 is disposed to insulate the three-phase stator coil 6 from the stator core 5 and also insulate the inner layer conductor 33a of the conductor segment 33 and outer layer conductor 33b thereof from each other.

Figure 6:
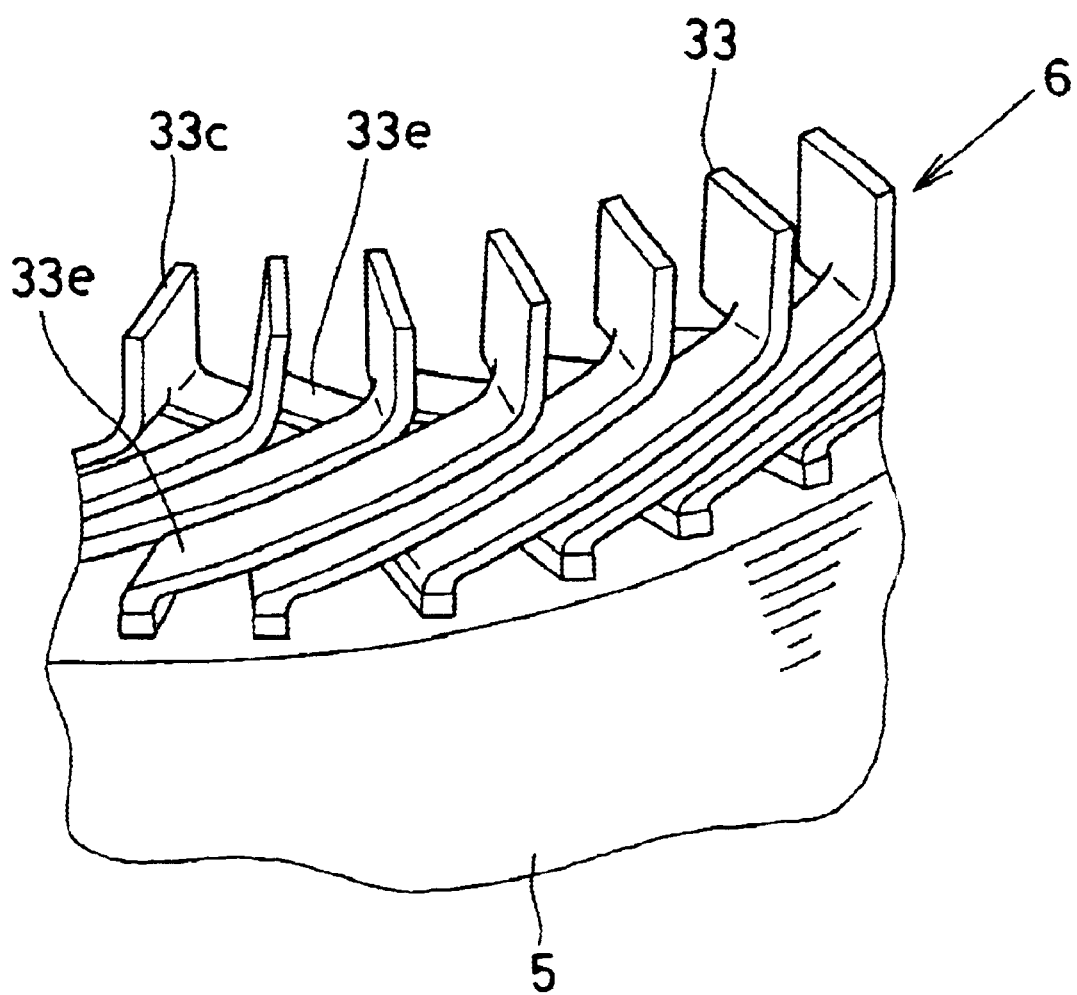
FIG. 6 is a perspective view illustrating coil ends of the three-phase stator coil.

The conductor segment 33 has a turn portion 33c that connects the two straight portions thereof and forms a front coil end, as shown in FIG. 6. The straight portions of the conductor segment 33 have respectively connection portions 33d at their ends. Ridge portions 33e of the conductor segment 33 extend diagonally from the stator core 5. As shown in FIG. 6, the inner layer conductor 33a and the outer layer conductor 33b incline in directions opposite to each other. The plurality of conductor segments 33 protrudes from the rear end of the stator core in the axial direction so that every two of them are connected to each other at the connection portions 33d at the end of the stator core remote from the pulley 20 to form a coil-end group 34.

A suitable space is formed between the neighboring two conductor segments 33 in the rear coil-end group to insulate one from the other. Therefore, a large number of cooling air passages is formed in the rear coil-end group 34 in which the connection portions 33d of the conductor segments 33 are aligned in a ring shape so that cooling air can traverse the same. Thus, the three-phase stator coil 6 provides high cooling performance. A plurality of the conductor segments 33 are bundled and inserted into the front end of the slot 29 so that the coil ends can be aligned. Then, the connection portions 33d of the inner layer conductor 33a or the outer layer conductor 33b, which protrude from the rear end of the slot 29 of the stator core 5, are bent in the circumferential direction so that the connection portions of inner and outer layer conductors of two conductor segments that are shifted by one-pole pitch are connected, by means of welding or the like, to form the three-phase stator coil 6.

The housing 7 is comprised of a pair of front frame 41 and rear frame 42, which is fastened by a plurality of through-bolts 40. A rear cover 43 is fastened to the rear end of the rear frame 42 by a plurality of bolts 44 and nuts 45. The front frame 41, the rear frame 42 and the rear cover 43 have respectively a plurality of air vents 41a, 42a and 43a opened in axial and radial directions.

The front frame 41 and the rear frame 42 rotatably support the rotor 1 via a pair of ball bearings 38 and 39 and hold the stator 4. The front frame 41 and the rear frame 42 have outwardly projecting brackets 46–48 to be fixed to an engine. The brackets 46 and 47 have through holes 46a and 47a for receiving the through-bolts at the edges thereof. The bracket 48 has a through hole 48a at the edge thereof in which a cylindrical slide bushing 49 is inserted. The slide bushing 49 has a through hole 49a for a bolt.

The three-phase rectifier unit 8 is comprised of a plurality of diodes for converting AC power generated by the three-phase stator coil 6 into DC power, a cooling fin 51 and a DC output terminal (not shown) for outputting the DC power. A neutral point and lead ends of the three-phase stator coil 6 are connected to the plurality of rectifiers via AC terminals that are insert-molded into a terminal body 52 with resinous insulation material.

The voltage regulator 9 is connected to a higher side terminal of the field coil 2 to protect the field coil from voltage applied thereto when the vehicle AC generator does not operate. The voltage regulator 9 is comprised of a terminal body 54 that has respective outside connection terminals 53 that are insert-molded with resinous insulation material and a cooling fin (not shown) for cooling heat generating parts that are supported by the terminal body 54. The terminal body 54 accommodates a hybrid IC or the like (not shown) therein and has a male connector 55 that is integrated therewith.

The operation of the vehicle AC generator according to the first embodiment is described briefly with reference to FIGS. 1–6.

When rotation of the engine is transmitted to the pulley 20 via a belt or the like, the shaft 11 rotates to rotate the rotor 1. In other words, the shaft 11, the pole core 12, the pair of slip rings 15 and 16 and the field coil 2 rotate together. When field current is supplied to the field coil 2 by the voltage regulator 9, through brushes 17 and 18, the pair of slip rings 15 and 16 with the magnetic flux from the cylindrical permanent magnet 3 being supplied thereto, all the claw poles 23 of one core section of the pole core 12 are polarized into N-pole and all the claw poles 23 of the other core section are polarized into S-pole.

Consequently, alternating current is induced in the stator coil 6 that is wound around the stator core 5 of the stator 4 that rotates relative to rotor 1. The three-phase alternating current is inputted to the rectifiers through respective lead ends and respective AC terminals to be converted into direct current. If the output voltage of the three-phase stator coil 6 becomes higher than the battery voltage, the converted direct current is supplied to the battery through the DC terminal and lead wires. Thus, the battery is charged with battery current.

Thus, a compact and powerful vehicle AC generator can be provided.

Only one cylindrical permanent magnet 3 is necessary without any additional parts such as holders or any work for assembling. Because the number of cylindrical permanent magnets 3 is drastically reduced, the assembling cost of the cylindrical permanent magnet 3 as well as the production cost per unit can be reduced.

Because the cylindrical permanent magnet 3 is simply cylindrical, it is easy to orient the magnetic characters of the cylindrical permanent magnet. It is also possible to use sintered permanent magnet material or resinous permanent magnet material for the cylindrical permanent magnet 3.

Further, the plurality of claw poles 23 supports the cylindrical permanent magnet 3 against outwardly acting centrifugal force. The magnetic member 32 also reinforces the strength of the cylindrical permanent magnet 3 against the centrifugal force. The magnet member 32 also improves permeance of the cylindrical permanent magnet 3 so that the cylindrical permanent magnet 3 can be prevented from being demagnetized by the counter magnetic field of the field coil 2. Moreover, the improvement in permeance of the cylindrical permanent magnet 3 makes magnetization of the cylindrical permanent magnet 3 after being assembled into the rotor easier. This can improve degree of freedom of manufacturing and reduce the volume of the magnetizing device so that manufacturing cost of the vehicle AC generator can be lowered. Further, the leakage flux of the cylindrical permanent magnet 3 can be reduced, thereby improving the output power thereof.

The non-magnetic member 31 prevents the cylindrical permanent magnet 3 from flying off even if the cylindrical permanent magnet 3 cracks. Further the non-magnetic member 31 protects the cylindrical permanent magnet 3 from foreign particles. Moreover, since the non-magnetic member 31 and the magnetic member that cover the outer periphery and the inner surface of the cylindrical permanent magnet are generally cylindrical, the manufacturing steps can be made much simpler than a conventional manufacturing steps using magnet holders.

Since an annular air gap 27 is formed between the outer periphery of the field coil and the inner surface of the cylindrical permanent magnet, cooling air flows along the air gap 27 to cool both the cylindrical permanent magnet 3 and the field coil 2. Therefore, the magnetic flux of the cylindrical permanent magnet and the magnetic flux of the field coil 2 can be increased, so that the output power can be increased.

Figure 7A:
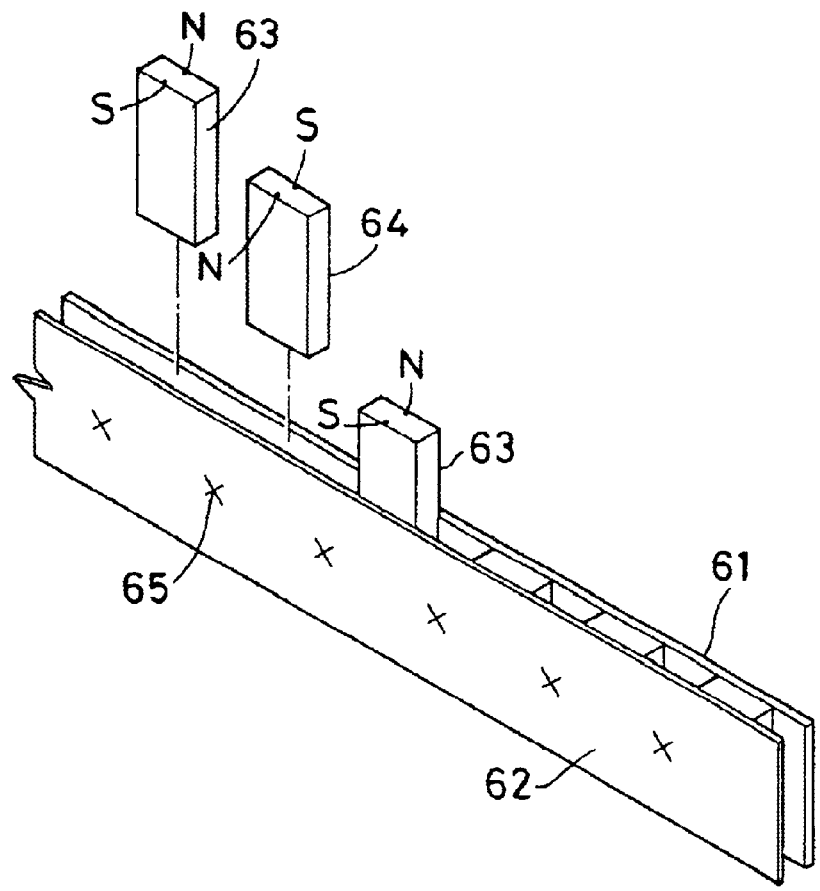
FIGS. 7A and 7B are perspective views illustrating steps of manufacturing a cylindrical permanent magnet.
Figure 7B:
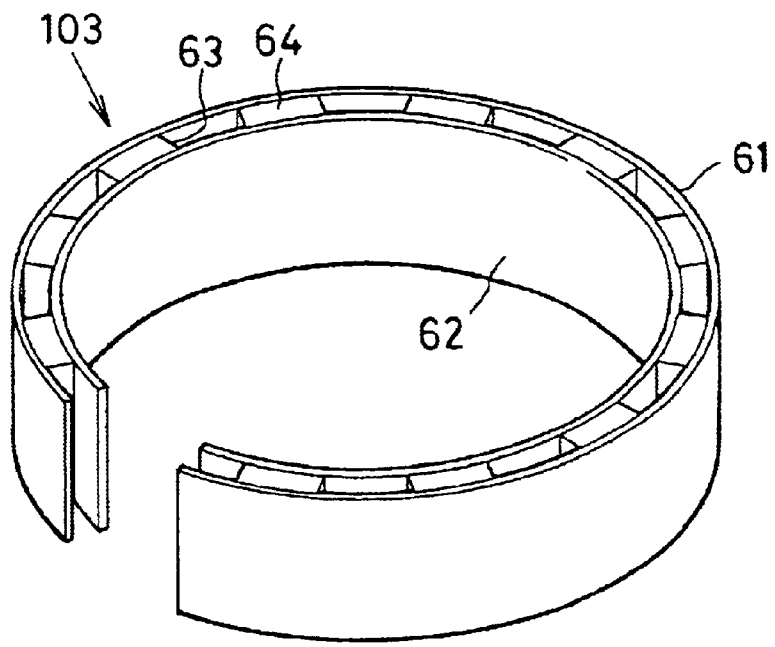

A rotor according to a second embodiment of the invention is described with reference to FIGS. 7A and 7B.

A cylindrical permanent magnet unit 103 according to the second embodiment is comprised of a plurality of permanent magnets 63 and 64 that are circumferentially disposed between non-magnetic member 61 made of stainless steel and magnetic member 62 made of iron alloy. The permanent magnets 63 and 64 are made of rare earth magnetic material such as neodymium. The permanent magnet 63 has an S pole on the side of the non-magnetic member 61 and an N pole on the side of the magnetic member 62. On the other hand, the permanent magnet 64 has an N pole on the side of the non-magnetic member 61 and an S pole on the side of the magnetic member 62. When the cylindrical permanent magnet is manufactured, the same number of the permanent magnets 63 and 64 as the poles are alternately disposed between the non-magnetic member 61 and the magnetic member 62 in the circumferential direction at approximately the same intervals as the claw poles 23 disposed radially outside of the pole core 12 of the rotor 1.

The non-magnetic member 61 and the magnetic member 62 and the neighboring permanent magnets 63 and 64 are welded or clamped by dimpling at portions 65 so that a plurality of permanent magnets 63 and 64 are held between the non-magnetic member 61 and the magnetic member 62. Thereafter, the non-magnetic member 61 and the magnetic member 62 are formed to be cylindrical. Thus, the cylindrical permanent magnet unit 103 is formed.

Instead of neodymium permanent magnets, Alnico, ferrite or resin (sintered mixture of powdered Nd, Fe and B molded with nylon) permanent magnets can be used. It is not necessary for the cylindrical permanent magnet to be oriented. The non-magnetic member that covers the outer periphery of the cylindrical permanent magnet 3 can be made of resin. The cylindrical permanent magnet 3 or permanent magnet unit 103 can be fixed by welding or bonding.

The present invention can be applied to a brushless AC generator driven via a belt or directly by an engine other than the vehicle engine, an electric motor, a water wheel or a wind wheel. In this specification, a plurality of diodes as the rectifiers are exemplified. However, a plurality of MOS-FETS can be used as the rectifiers.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotor of an AC generator comprising:
   a field coil for generating magnetomotive force when energized;
   a pole core having said field coil therein and a plurality of claw poles extending in an axial direction and disposed in an annular area around said field coil to be excited by said magnetomotive force of said field coil;
   a cylindrical permanent magnet disposed between said annular area and said field coil to have the same polarity as said claw poles when excited;
   a non-magnetic member covering an outer periphery of said permanent magnet; and
   a magnetic member covering an inner surface of said permanent magnet.

2. The rotor according to claim 1, wherein said cylindrical permanent magnet is radially oriented.

3. The rotor according to claim 1, further comprising a first cooling fan fixed to an end of said pole core, a second cooling fan that is different in shape from said first cooling fan and is fixed to the other end of said pole core, wherein said non-magnetic member is disposed in contact with said plurality of claw poles and said magnetic member is spaced apart from said field coil.

4. The rotor according to claim 1, wherein said cylindrical permanent magnet is made of rare-earth ferromagnetic material.

5. The rotor according to claim 1, wherein the cylindrical permanent magnet is radially magnetized to provide magnetic poles on an outer periphery thereof and magnetic poles on an inner periphery thereof, the magnetic poles on the outer periphery being the same as claw poles when excited, and wherein
   the magnetic member is continuous along a circumferential direction and provides magnetic flux path between adjacent magnetic poles on the inner periphery of the permanent magnet.

6. A rotor of an AC generator, comprising:
   a field coil;
   a pole core having a plurality of claw poles disposed in an annular area to enclose said field coil to be excited by said field coil to provide a plurality of magnetic fields when said field coil is energized;
   a cylindrical permanent magnet disposed between said annular area and said field coil to supplement said plurality of magnetic fields;
   a non-magnetic member covering an outer periphery of said permanent magnet; and
   a magnetic member covering an inner surface of said permanent magnet.

7. The rotor according to claim 6, wherein the cylindrical permanent magnet is radially magnetized to provide magnetic poles on an outer periphery thereof and magnetic poles on an inner periphery thereof, the magnetic poles on the outer periphery being the same as said claw poles when excited, and wherein
   the magnetic member is continuous along a circumferential direction and provides magnetic flux path between adjacent magnetic poles on the inner periphery of the permanent magnet.

8. A rotor of an AC generator, comprising:
   a housing;
   a stator supported on the housing, the stator having a stator core;
   a rotor rotatably supported on the housing, the rotor having a plurality of claw poles arranged along a circumferential direction and provided to oppose to the stator;
   a field coil magnetically coupled with the rotor for alternately magnetizing the claw poles when excited; and
   a permanent magnet member disposed radially inside of the claw poles, the permanent magnet member having a plurality of first and second magnetized sections alternately magnetized in opposite radial directions to have the same plurality as said claw poles and an annular magnetic member disposed inside the first and second magnetized sections to provide a magnetic flux path between the first and second magnetized sections.

9. The vehicular AC generator according to claim 8, further comprising an annular non-magnetic member disposed outside the first and second magnetized sections.

10. The vehicular AC generator according to claim 9, wherein the first and second magnetized sections are formed of separated permanent magnets.

11. The vehicular AC generator according to claim 10, wherein the first and second magnetized sectios are part of a plurality of permanent magnets respectively disposed radially inside of the claw poles.

12. The vehicular AC generator according to claim 9, wherein said permanent magnet member is a cylindrical member and the first and second magnetized sections are formed in said member.

13. The vehicular AC generator according to claim 12, wherein said permanent magnet member comprises a plurality of magnet pieces and the first and second magnetized sections are respectively formed in said magnet pieces.

14. The vehicular AC generator according to claim 9, wherein the non-magnetic member is disposed to be in contact with inside surfaces of the claw poles, the first and second magnetized sections are disposed to be in contact with an inside surface of the non-magnetized member, and the magnetic member is disposed to be in contact with inside surfaces of the permanent magnet member.

* * * * *